Dec. 29, 1953 W. D. MOEHRING ET AL 2,664,469

PREAMPLIFIER

Filed March 22, 1951

INVENTOR.
LAWRENCE V. WELLS
WILLIAM D. MOEHRING

BY Ostrolenk & Faber

ATTORNEYS

Patented Dec. 29, 1953

2,664,469

UNITED STATES PATENT OFFICE 2,664,469

PREAMPLIFIER

William D. Moehring, Charlotte, and Lawrence V. Wells, Kalamazoo, Mich., assignors to Wilcox-Gay Corporation, Charlotte, Mich., a corporation of Michigan Application March 22, 1951, Serial No. 217,002

4 Claims. (Cl. 179—100.11)

Our invention relates to phonograph and microphone amplification circuits in radio receiver circuits, and more particularly to circuit arrangements which enable a single tube to be used either as an audio frequency pre-amplifier or as a radio frequency amplifier in a conventional radio receiver circuit. More specifically, our present invention is a continuation of the invention described in application Serial No. 109,294.

In radio phonograph combination equipment, the audio stage of the radio receiver circuit is usually employed in reproduction from phonograph recordings or for the amplification of microphone signals for public address to be reproduced by the loudspeaker of the equipment.

Although the audio frequency stage in the conventional radio receiver amplifies the signal sufficiently for good loudspeaker operation, it has been found inadequate for reproduction from some phonograph pickups or for loudspeaker operation from a microphone.

It has therefore heretofore been found necessary to employ an additional pre-amplifier stage of amplification. The additional tube and components involved quite obviously increased the cost and bulk of the equipment. Moreover, this additional equipment is particularly undesirable in a portable or extremely compact equipment where the microphone pre-amplifier represents not only increased bulk and cost but also adds to the power consumption and resultant heat dissipation of the unit. The increase in the heat dissipation requires increased ventilation or, in the alternative, higher operating temperatures must be tolerated. This is necessarily a design limitation where compactness is a prime consideration.

We have discovered that by the use of suitable means, we can employ one of the tubes in the radio stage as a part of the audio frequency amplifier when the system is to be operated for public address or phonograph reproduction.

Accordingly, an object of the present invention is to provide novel circuit arrangements in which one of the tubes in the system serves either as a microphone amplifier stage or as a conventional radio frequency amplifier, depending on whether the signals are of audio frequency or of radio frequency, respectively.

A further object of my invention is to provide novel circuit arrangements for obtaining dual function of the components of one tube of a radio phonograph microphone receiving circuit.

Still a further object of my invention is to provide a microphone amplifier which does not entail additional heat dissipation beyond that existing when the unit is employed as a conventional radio receiver.

In one of the embodiments of our present invention the use of a single tube as radio frequency amplifier and as audio frequency amplifier when it is to be operated for public address or phonograph reproduction is made possible by the novel introduction of switching means. In switching, however, a radio frequency stage, to function as a pre-amplifier stage, any appreciable change in the capacity coupling between the signal grid and the output plate would render the radio frequency amplifier unstable.

It is accordingly essential in such switching operations to avoid any appreciable change in such coupling.

Accordingly, a further object of our invention is to provide circuit switching means permitting the use of a single tube as either a microphone or as a conventional radio frequency amplifier without significant increase in the signal grid to output plate capacity coupling when the tube is used for radio frequency amplification.

In another embodiment of our present invention the use of a single tube as radio frequency amplifier and as audio frequency amplifier is made possible by the introduction, in the input and output circuit of the tube, of appropriate radio frequency chokes, which, as is known in the art, present high impedance to radio frequency signals and are practically short circuits for audio frequency signals.

Accordingly, another object of our present invention is to provide electric elements in the tube's circuits, that block radio frequency signal while providing paths of low impedance to audio frequency signals.

These and other objects of our invention will be apparent in the description which follows in connection with the drawings in which.

Figure 1:
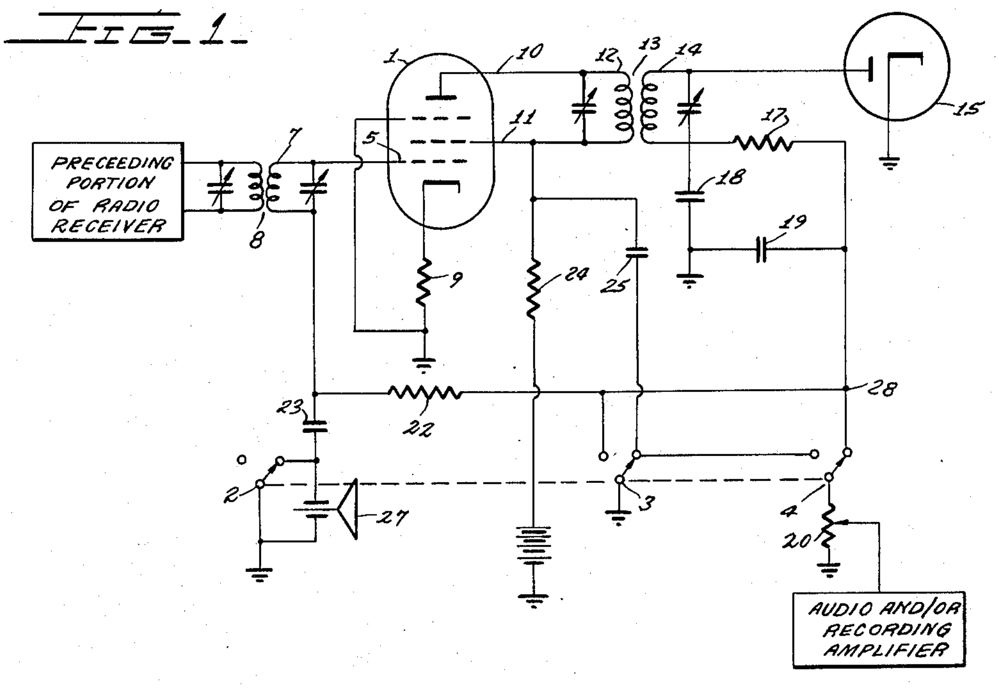
Figure 1 is a circuit diagram of one embodiment of our invention.

Referring now to Figure 1, tube 1 serves alternatively as a microphone pre-amplifier or as a conventional intermediate frequency amplifier. Switches 2, 3 and 4, mounted on a common operating shaft, are shown in the drawing in the position wherein tube 1 functions as an intermediate or radio frequency amplifier.

The signal input to the grid 5 of the tube 1 is obtained from the secondary winding 7 of the intermediate frequency transformer 8. The tube is biased by means of the cathode resistor 9. Plate 10 is connected to the primary winding 12 of the intermediate frequency transformer 13. The secondary winding 14 of this transformer 13 is connected to the anode of diode 15 and to the diode filter comprising resistor 17 and condensers 18 and 19.

The diode filter in turn is connected to volume control resistor 20 which precedes the conventional audio or recording amplifier here illustrated in a box diagram since any well known audio amplifier stage may be employed.

Automatic volume control bias for grid 5 of tube 1 is supplied through the filter comprising resistor 22 and condenser 23. The plate and screen supply for tube 1 is obtained from the high voltage source through the resistor 24 by-passed to ground through condenser 25. Resistor 24 and condenser 25 form a decoupling filter for radio frequencies in a manner well known in the art.

In the position shown for switches 2, 3 and 4, the microphone 27 is short-circuited by the switch 2. The equipment is in condition for reception of radio signals which are received over the box identified as "Preceding Portion of Radio Receiver" which may be of any conventional construction. Tube 1 which is a part of the radio receiver in the condition shown in the drawing receives signals through the transformer 8 impressed across the input at grid 5.

Output signals from the radio frequency stage after detection are impressed across the usual audio frequency amplifier and thence to the loudspeaker in the manner well known in the art.

If now the microphone 27 or phonograph pickup is to be operated, the gang switches 2, 3 and 4 are rotated on their shaft in a counterclockwise direction as viewed from the drawing to their alternate contact positions. As a result of the operation of switch 2 to disengage the contact shown in the drawing to its alternate position, the microphone 27 is coupled through condenser 23 and secondary winding 7 to the grid 5 of tube 1.

Inasmuch as the transformer 8 is a radio frequency transformer, the secondary winding 7 has negligible impedance at audio frequency and accordingly will function only as a conductor. As a result of the switching operation at switch 3, resistor 22 which previously was a part of the filter circuit including condenser 23 now serves as a grid leak for tube 1.

Inasmuch as transformer 13 is a radio frequency transformer primary winding 12 has negligible impedance at audio frequency and therefore effectively connects plate 10 and screen 11 so that the tube 1 now functions as a triode. The majority of pentodes suitable for use as intermediate frequency amplifiers provide satisfactory triode operation when the screen and plate are connected together.

Resistor 24 functions as a plate load resistance. It may be of sufficiently low value to maintain good intermediate frequency performance when tube 1 is used as a part of the radio frequency circuit and, at the same time, be sufficiently large to provide good amplification at audio frequency. This is because the triode connection provides a medium amplification constant with a relatively low plate resistance. Condenser 25, which previously functioned as a radio frequency by-pass becomes an audio frequency coupling condenser to volume control 20 over the switch 4 in its second position.

It will be noted particularly that switches 2, 3 and 4 are so arranged that the radio frequency connections such as the lead between winding 7 and grid 5, and the lead between plate 10 and winding 12 are not affected in the switching operation. By leaving transformer windings 7 and 12 permanently connected in their respective circuits, the switches do not contribute any capacity coupling which would disturb the normal function of the tube as an intermediate frequency amplifier.

Had the switches been inserted directly in the leads of grid 5 and plate 10 as would normally be expected in changing the function of tube 1, additional capacity would have been introduced between these elements which would have contributed to amplifier instability or would have reduced the amount of stable gain which could be realized.

It is good engineering practice to disable the preceding portion of the radio receiver when the microphone is connected for use. If this is not done, strong radio signals may be rectified and mixed with the signal from the microphone.

Automatic volume control voltage for the preceding stage or stages of the radio receiver is preferably applied through a separate filter network from point 28 rather than through the filter comprising resistor 22 and condenser 23. This prevents excessive loading of microphone 27 which will ordinarily be a high impedance type unit, such as a crystal microphone. It also prevents hum coupling from the antenna or loop of the radio receiver to grid 5.

Switches 2 and 3 must provide low impedance ground returns when the tube is used as an intermediate frequency amplifier. If a common lead to ground is used, the common impedance between the input and output circuits may contribute to amplifier instability. A separate ground lead for each switch is preferred.

To further illustrate the operation of the invention, the following circuit values have been employed in association with a type 6BA6 tube:

| | | |
|---|---|---|
| 9 | ohms | 68 |
| 22 | megohms | 2.2 |
| 23 | microfarad | .05 |
| 24 | ohms | 10,000 |
| 25 | microfarad | .01 |

Obviously the invention is not restricted to the intermediate frequency radio frequency amplifier shown, but is equally applicable to radio frequency amplifiers functioning at the original signal frequency as well.

Figure 2:
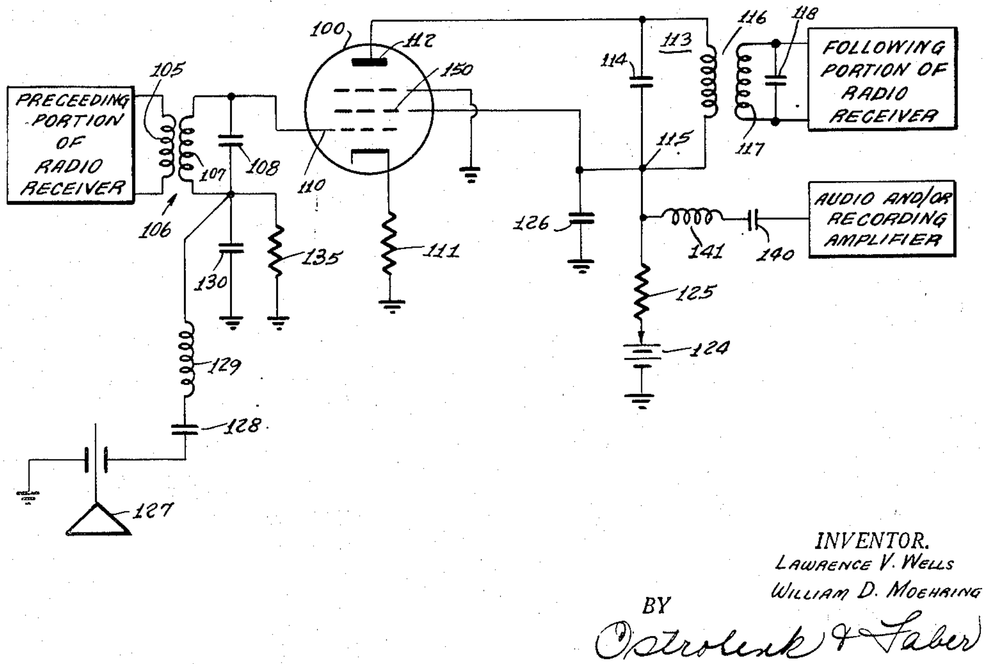
Figure 2 is a circuit diagram of another embodiment of our invention.

Referring now to Figure 2, which shows the circuit of another embodiment of our invention, tube 100 serves alternatively as a microphone, pre-amplifier or as a conventional intermediate frequency amplifier.

Signals from the "Preceding Portion of Radio Receiver," which may be of any conventional construction, are applied to the primary winding 105 of coupling transformer 106. Secondary winding 107 of transformer 106, in parallel with capacitor 108, constitutes a tuned circuit for the input of tube 100.

The signals are then fed to the control grid 110 of tube 100. The tube 100 is biased by means of the cathode resistor 111. Plate 112 is connected to the tuned circuit 113, consisting of capacitor 114 and primary winding 115 of coupling transformer 116. The secondary winding 117 of transformer 116 is connected to a capacitor 118, thus forming another tuned circuit for the input of the "Following Portion of Radio Receiver," which may also be of any conventional construction.

The plate and screen supply for tube 100 is obtained from the high voltage source 124 through the resistor 125, by-passed to ground through capacitor 126. Resistor 125 and capacitor 126 form a decoupling filter for radio frequencies in a manner well known.

A microphone 127 or phonograph pickup is connected through coupling capacitor 128 and radio frequency choke 129 to the control grid 110 of tube 100. The circuit consisting of microphone 127, coupling capacitor 128 and radio frequency choke 129 is by-passed to ground for radio frequency signals by the small radio frequency by-pass capacitor 130. Connected between control grid 110 and ground is grid leak resistor 135.

An "Audio and/or Recording Amplifier" is connected through coupling capacitor 140 and radio frequency choke 141 to the output circuit of tube 100, or more precisely, at point 142 between plate tuned circuit 113 and plate supply resistor 125, so that when tube 100 is to operate as a triode (audio operation), resistor 125 functions as a plate load resistor.

When tube 100 is used as a radio frequency amplifier, signals from the "Preceding Portion of Radio Receiver" and having a frequency around the anti-resonant frequency of tuned circuit 107, 108, are first amplified by tube 100 and then through transformer coupling 116 are fed into the "Following Portion of Radio Receiver." These radio frequency signals cannot go into the audio circuits connected to tube 100, since radio frequency chokes 129 and 141 present a path of very high impedance to radio frequency signals. Therefore, in radio frequency operations tube 100 operates as a pentode.

When, on the other hand, tube 100 is used as an audio amplifier, audio signals from microphone 127 are fed to the grid 110 of tube 100 through coupling capacitor 128 and radio frequency choke 129, which acts as a low resistance path since the signals are of audio frequency.

Inasmuch as the transformer 106 is a radio frequency transformer, the secondary winding 107 has negligible impedance at audio frequency and accordingly will function only as a conductor, and resistor 135 operates as a grid leak resistor for grid 110 of tube 100.

Inasmuch as transformer 116 is a radio frequency transformer, primary winding 115 has negligible impedance at audio frequency and therefore effectively connects plate 112 and screen grid 150 so that the tube 100 now functions as a triode. The majority of pentodes suitable for use as intermediate frequency amplifiers provide satisfactory triode operation when the screen and plate are connected together.

As above mentioned, resistor 125 functions as a plate load resistance. It may be of sufficiently low value to maintain good intermediate frequency performance when tube 100 is used as a part of the radio frequency circuit and, at the same time, be sufficiently low to provide good amplification at audio frequency.

An "Audio and/or Recording Amplifier" is connected to the plate load resistor 125 through coupling capacitor 140 and radio frequency choke 141, which also functions as a virtual short circuit for signals of audio frequencies.

To further illustrate the operations of our invention, the following circuit values have been employed in association with a type 6BA6 tube:

| | | |
|---|---|---|
| 111 | ohms | 68 |
| 125 | do | 10,000 |
| 126 | microfarad | 0.0005 |
| 128 | do | 0.05 |
| 130 | do | 0.0001 |
| 135 | ohms | 100,000 |
| 140 | microfarad | 0.05 |

As above pointed out, obviously our invention is not restricted to the intermediate frequency, radio frequency amplifier shown, but is equally applicable to radio frequency amplifier functioning at the original signal frequency as well.

Although we have shown a preferred embodiment of our invention, it will be obvious that it may take other forms as herein suggested, without departing from the spirit of the invention. Therefore, we prefer to be limited not by the specific disclosures herein contained, but only by the appended claims.

We claim:

1. In an amplifier circuit having a radio frequency amplifier including at least one stage of radio frequency amplification comprising a pentode having an input and output circuit, a radio frequency transformer in said radio frequency stage connected to the input of said pentode, a second radio frequency transformer in said radio frequency stage connected to the output of said pentode and connecting said anode and screen grid to form a low impedance audio frequency connection therebetween to effectively make said pentode a triode, a microphone connected to the input circuit of said pentode, a first switch having a plurality of positions in one of which it shunts said microphone, a filter including a resistor and a condenser connected between the input and output of said pentode for providing automatic volume control bias for the input of said pentode, a second switch having a plurality of positions, a source of high voltage for said pentode, a resistor connected in the circuit of said high voltage source, a radio frequency by-pass condenser providing a by-passing circuit around said resistor, said second switch in one of its positions completing the circuit of said by-pass condenser, an audio frequency amplifier, a third switch having a plurality of positions in one of which it connects the secondary of said second transformer to the input of said audio frequency amplifier, said microphone connection to said pentode input being operative when said first switch is in another than said one position, circuit connections including said second switch in another than said one of its positions for connecting said filter resistance to the input of said pentode as a grid resistance for said electron tube and circuit connections including said third switch in another than said one position for directly connecting the output of said triode through said by-pass condenser as a coupling condenser to the input of said audio frequency amplifier.

2. In an amplifier circuit having an audio frequency amplifier and a radio frequency amplifier including at least one stage of radio frequency amplification comprising a pentode having an input and output circuit, a radio frequency transformer in said radio frequency stage connected to the input of said pentode, a second radio frequency transformer in said radio frequency stage connected to the output of said pentode, a microphone connected to the input circuit of said pentode, a first switch having at least a first position which shunts said microphone and a second position which opens said shunt, a second switch having a first and second position, a source of high voltage for said pentode, circuit connections including said second switch in its first position for providing a radio frequency condenser by-pass from said high voltage source and in its second position for providing a grid resistance for said tube, a third switch having a first and second position, circuit connections including said third switch in its first position for connecting the secondary of said second transformer to said audio frequency amplifier, and including said second position for connecting the output of said triode directly through said radio frequency condenser by-pass acting as a coupling condenser to the input of said audio frequency amplifier.

3. In an amplifier circuit having an audio frequency amplifier and a radio frequency amplifier including at least one stage of radio frequency amplification comprising a pentode having an input and output circuit, a radio frequency transformer in said radio frequency stage connected to the input of said pentode, a second radio frequency transformer in said radio frequency stage connected to the output of said pentode, an audio frequency generating means, a plurality of switches, circuit connections including one of said switches for selectively rendering said audio frequency generating means non-operative and for operatively connecting said means to the input of said tube, circuit connections including another of said switches for selectively switching the grid return circuit and disconnecting and connecting grid bias to said tube and circuit connections including still another of said switches for selectively connecting the secondary of said second transformer and the primary of said second transformer to the input of said audio frequency amplifier.

4. In an amplifier circuit having at least one stage of radio frequency amplification including a pentode having an input and output circuit, a radio frequency transformer in said radio frequency stage connected to the input of said pentode, a second radio frequency transformer in said radio frequency stage connected to the output of said pentode, a microphone having circuit connections to the input of said tube, a switch having a plurality of positions in one of which it shunts said microphone, a filter including a resistor and a condenser connected between the input and output of said pentode for providing automatic volume control bias for the input of said multi-grid tube, a second switch having a plurality of positions, a source of high voltage for said pentode, a resistor connected in the circuit of said high voltage source, a radio frequency by-pass condenser, said second switch in one of its positions completing the circuit of said by-pass condenser, a third switch having a plurality of positions in one of which it connects the secondary of said second transformer to said audio frequency amplifier, said circuit connection including said second switch in another of its positions for connecting said filter resistance as a grid resistor for said triode and circuit connections including said third switch for connecting the output of said triode through said radio frequency by-pass condenser acting as an audio frequency coupling condenser to the input of said audio frequency amplifier.

WILLIAM D. MOEHRING.
LAWRENCE V. WELLS.

References Cited in the file of this patent

UNITED STATES PATENTS

| Number | Name | Date |
|---|---|---|
| 2,519,063 | Moir | Aug. 15, 1950 |
| 2,548,531 | Hayes | Apr. 10, 1951 |